UNITED STATES PATENT OFFICE.

HEINRICH HEIMANN, OF DESSAU, GERMANY, ASSIGNOR TO ACTIEN GESELLSCHAFT FÜR ANILIN FABRIKATION, OF BERLIN, GERMANY.

SULFURIZED DYES AND PROCESS OF MAKING SAME.

1,096,715. Specification of Letters Patent. Patented May 12, 1914.

No Drawing. Application filed October 16, 1912. Serial No. 726,121.

*To all whom it may concern:*

Be it known that I, HEINRICH HEIMANN, a citizen of the German Empire, residing at Dessau, Germany, my post-office address being Friedrich-Schneiderstrasse 63, Dessau, Germany, have invented new and useful Improvements in new Sulfurized Dyes and Processes of Making Same, of which the following is a specification.

My present invention relates to a new class of sulfurized dyes of excellent tinctorial qualities; the tints obtained therewith on cotton in a bath containing sodium sulfid are of an excellent fastness to washing even with a boiling soap solution. Likewise they are of a fastness to chlorin which, generally speaking, greatly surpasses that of the known sulfur dyes, so that many of the new products are practically fast to chlorin.

My new products, generally speaking, are obtained by acting with a sulfurizing agent, for example with sulfur or with a polysulfid, in the presence or not of a condensing agent and of a solvent or diluent, upon a 4-hydroxydiarylamin in which only the 4-hydroxy-aryl group is capable of assuming the paraquinoid form.

In my present application I claim more especially those new sulfurized dyes which derive from a 4-hydroxydiphenylamin, which does not contain a sulfonic group and in which the 4'-position is free, but which in the other places of the two benzene nuclei may contain further suitable substituents, such as a halogen, an alkyl or alkoxy group, a carboxylic group, etc.

The following examples may serve to illustrate my invention, the parts being by weight:

1. 40 parts of 4-hydroxydiphenylamin are heated with 40 parts of sulfur until the mass forms a homogeneous melt; then 10 parts of aluminium chlorid are added and the temperature is raised to about 150° C., a lively evolution of hydrogen sulfid occurring. After about half an hour the mass forms a thick paste which is then further heated for about 5 hours, the temperature being raised to about 190° C. The product thus obtained produces on cotton in a bath containing an alkali sulfid brown-red tints of an excellent fastness to washing even with a boiling soap solution, and of a very remarkable fastness to chlorin.

2. A mixture of 30 parts of 4-hydroxydiphenylamin and 30 parts of sulfur is heated by means of an oil bath, the vessel containing the mixture being introduced into the oil bath at a temperature of about 160° C. and the temperature being raised to about 200° C. during about 2 hours. This temperature is maintained for about 8–12 hours whereupon the mass is allowed to cool, pulverized and again heated for about 4 hours at a temperature of 220–225° C. The product from this process gives a beautiful brown shade on cotton without a mordant, which is of excellent fastness to washing and of fastness to chlorin surpassing the average.

3. A mixture of 30 parts of 4-hydroxydiphenylamin and 30 parts of sulfur is heated in an oil-bath, the temperature being gradually raised to 200° C.; this temperature is maintained for about 8 hours and the mass is then heated at about 250° C. for about 4 hours. There is obtained a dye which in its tinctorial qualities very much resembles the product of the foregoing example. It possesses likewise a remarkable fastness to chlorin.

4. 60 parts of sulfur are dissolved in 180 parts by volume of a sodium sulfid solution containing 50 per cent. $Na_2S.9H_2O$; into this solution are introduced 30 parts of 4-hydroxydiphenylamin, whereupon the mass is heated to the boil in a reflux apparatus for 40–80 hours. The reaction being finished, the dye is isolated in the usual manner and a product is obtained which produces on cotton without a mordant in a bath containing an alkali sulfid red-brown tints of very good fastness to washing and remarkable fastness to chlorin.

The new dyes derived from a 4-hydroxydiphenylamin and obtained as above are dark brown to black powders which are practically insoluble in alcohol, glacial acetic acid and benzene; they are difficultly soluble in nitrobenzene, anilin, pyridin and chloro-derivatives of benzene. In concentrated sulfuric acid they dissolve to blue to black solutions, which on the addition of boric acid remain unaltered, whereas the addition of aluminium powder gradually causes decoloration. In 25% fuming sulfuric acid they dissolve to violet to black solutions which are also gradually decolorized on the addition of aluminium powder.

The new dyes are capable of being dyed from a hydrosulfite vat giving, generally speaking, a yellow vat, from which cotton is dyed, generally speaking, in red-brown tints.

It is obvious to those skilled in the art that my present invention is not limited to the foregoing examples or to the details given therein. Thus for instance instead of 4-hydroxydi-phenylamin used in the foregoing examples 4-oxy-4'-chlorodiphenylamin or 4-oxy-3' methyldiphenylamin or 4-oxy-3'-chlordiphenylamin may be employed. Furthermore, instead of the 4-hydroxydiarylamins named above the corresponding thio-compounds may be used, i. e. the corresponding derivatives of thiodiphenylamin or of a thio-phenylanaphthylamin, such, for instance, as para-oxythiodiphenylamin.

It may also be stated that the proportions of the ingredients as well as the temperature of reaction or the duration of heating may be altered within wide limits without departing from the scope of my present invention.

Having now described my invention and the manner in which it may be performed what I claim is,—

1. The manufacture of new sulfurized dyes fast to washing and to chlorin by acting with a sulfurizing agent upon a 4-hydroxydiarylamin in which only the 4-hydroxyaryl-group is capable of assuming the para-quinoid form.

2. The manufacture of new sulfurized dyes fast to washing and to chlorin by acting with sulfur upon a 4-hydroxydiarylamin in which only the 4-hydroxyaryl-group is capable of assuming the para-quinoid form.

3. The manufacture of new sulfurized dyes fast to washing and to chlorin by acting with sulfur in the presence of a substance being a liquid at the temperatures prevailing during the reaction upon a 4-hydroxydiarylamin in which only the 4-hydroxyaryl-group is capable of assuming the para-quinoid form.

4. The manufacture of a new sulfurized dye, fast to washing and to chlorin, by acting with a sulfurizing agent upon 4-hydroxydiphenylamin.

5. The manufacture of a new sulfurized dye fast to washing and to chlorin by acting with sulfur upon 4-hydroxydiphenylamin.

6. As new articles of manufacture new sulfurized dyes, fast to washing and to chlorin, derived from a 4-hydroxydiarylamin in which only the 4-hydroxylaryl group is capable of assuming the para-quinoid form, which new dyes are practically insoluble in alcohol, glacial acetic acid and benzene and, which are difficultly soluble in nitrobenzene, anilin, pyridin and chloro-derivatives of benzene, and which new dyes dissolve in sulfuric acid and in 25% fuming sulfuric acid to intensely colored solutions, and which new dyes produce on unmordanted cotton from a dye-bath containing an alkalisulfid, generally speaking, red-brown tints of an excellent fastness to washing and of a very remarkable fastness to chlorin, and which new dyes are also capable of being dyed from a hydrosulfit vat, yielding yellow vat from which cotton is dyed, generally speaking, red-brown tints.

7. As new articles of manufacture new sulfurized dyes, fast to washing and to chlorin, derived from a 4-hydroxydiphenylamin, which new dyes are practically insoluble in alcohol, glacial acetic acid and benzene and which are difficultly soluble in nitrobenzene, anilin, pyridin and chloro-derivatives of benzene, the solution obtained therewith being brownish yellow to yellow-brown or brown-red colored, and which new dyes dissolve in sulfuric acid, generally speaking, to blue to black solutions, which solutions on the addition of boric acid remain unaltered, whereas the addition of aluminium powder gradually causes decoloration, these new dyes being soluble in 25% fuming sulfuric acid to violet to black solutions, which are also gradually decolorized on the addition of aluminium powder, and which new dyes produce on unmordanted cotton from a dye-bath containing an alkali sulfid bluish brown to red-brown to brown-red tints.

8. As a new article of manufacture a new sulfurized dye which may be obtained by heating 4-hydroxydiphenylamin with sulfur, which new dye is a black-brown powder practically insoluble in alcohol, glacial acetic acid, benzene and chloro-benzene, and very difficultly soluble in nitrobenzene, anilin and pyridin to yellow-brown to red-brown solutions, and which new dye dissolves in concentrated sulfuric acid to a gray-blue solution which remains unaltered on the addition of boric acid but is gradually decolorized by the addition of aluminium powder, this new dye dissolving in 25% fuming sulfuric acid to a red-violet solution being unaltered by the addition of boric acid but being gradually decolorized by the addition of aluminium powder, which new dye produces on unmordanted cotton from a dye-bath containing an alkali sulfid red-brown tints with a blue cast of an excellent fastness to washing and of a very remarkable fastness to chlorin, and which new dye is also capable of being dyed from a hydrosulfite vat yielding a yellow vat, from which cotton is dyed red-brown with a blue cast.

In testimony whereof I have signed my name to this specification in the presence of two subscribing witnesses.

HEINRICH HEIMANN.

Witnesses:
RUDOLPH FRICKE,
DORIS KRAHL.